(12) United States Patent
Fujisawa et al.

(10) Patent No.: US 9,349,370 B2
(45) Date of Patent: May 24, 2016

(54) SPEECH RECOGNITION TERMINAL DEVICE, SPEECH RECOGNITION SYSTEM, AND SPEECH RECOGNITION METHOD

(71) Applicant: DENSO CORPORATION, Kariya, Aichi-pref. (JP)

(72) Inventors: Yuki Fujisawa, Toyoake (JP); Toru Nada, Inazawa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/595,357

(22) Filed: Jan. 13, 2015

(65) Prior Publication Data

US 2015/0206532 A1    Jul. 23, 2015

(30) Foreign Application Priority Data

Jan. 17, 2014    (JP) .................................... 2014-6844

(51) Int. Cl.

| G10L 21/00 | (2013.01) |
|---|---|
| G10L 25/00 | (2013.01) |
| G10L 15/00 | (2013.01) |
| G10L 15/22 | (2006.01) |
| G10L 15/08 | (2006.01) |
| G10L 15/30 | (2013.01) |

(52) U.S. Cl.
CPC ............ G10L 15/22 (2013.01); *G10L 15/08* (2013.01); *G10L 15/30* (2013.01)

(58) Field of Classification Search
USPC .................. 704/231–257, 270–275
See application file for complete search history.

(56) References Cited

U.S. PATENT DOCUMENTS

| 5,930,751 | A * | 7/1999 | Cohrs ..................... G10L 15/22 704/231 |
|---|---|---|---|
| 6,985,865 | B1 * | 1/2006 | Packingham ........... G10L 15/22 704/270.1 |
| 8,340,975 | B1 * | 12/2012 | Rosenberger ........... G10L 15/22 704/270 |
| 2002/0167392 | A1 * | 11/2002 | Williams ................. H04L 51/24 340/3.3 |
| 2005/0179540 | A1 * | 8/2005 | Rubenstein ......... B60R 16/0373 340/539.18 |
| 2006/0282268 | A1 * | 12/2006 | Huang .................... G10L 15/26 704/275 |
| 2013/0179154 | A1 |  7/2013 | Okuno |
| 2013/0253926 | A1 |  9/2013 | Takahashi |

FOREIGN PATENT DOCUMENTS

| JP | 2012-256001 A | 12/2012 |
|---|---|---|
| JP | 2014-191030 A | 10/2014 |

OTHER PUBLICATIONS

U.S. Appl. No. 14/595,379, filed Jan. 13, 2015, Fujisawa et al.
Office Action issued Feb. 23, 2016 in the corresponding JP application No. 2014-006844 (with English translation).

* cited by examiner

*Primary Examiner* — Jesse Pullias
(74) *Attorney, Agent, or Firm* — Posz Law Group, PLC

(57) ABSTRACT

A speech recognition terminal device communicable with a speech recognition device includes a request device for requesting the speech recognition device to carry out speech recognition of a acquired speech command, a determination device for determining a filler word filling a waiting time until a result of the requested speech recognition is obtained from the speech recognition device, a filler speaking device for outputting the determined filler word during the waiting time, and a response device for responding to the user based on the acquired result of the speech recognition when the result of the speech recognition is acquired from the speech recognition device.

10 Claims, 4 Drawing Sheets

SPEECH RECOGNITION TERMINAL DEVICE, SPEECH RECOGNITION SYSTEM, AND SPEECH RECOGNITION METHOD

CROSS REFERENCE TO RELATED APPLICATION

The present application is based on Japanese Patent Application No. 2014-6844 filed on Jan. 17, 2014, disclosure of which is incorporated herein by reference

TECHNICAL FIELD

The present disclosure relates to a speech recognition terminal device, a speech recognition system, and a speech recognition method for performing speech recognition of a user's speech by communicating with a remote server.

BACKGROUND

A server type speech recognition technology utilizing so-called cloud computing is known (for example, refer to JP-A-2012-256001). In this kind of server type speech recognition technology, a user's speech command inputted into a terminal device is analyzed by a remote speech recognition server, and the terminal device carries out a reply operation in accordance with an analysis result received from the speech recognition server.

In JP-A-2012-256001, when a speech recognition device requests a speech recognition server to analyze a speech command, the speech recognition device cancels waiting for receipt of the analysis result when determining that the communication status within the wait time is not good. In this case, this is notified to the user.

The inventors of the present application found out the following difficulty concerning a server type speech recognition technology.

In the existing server type speech recognition, a certain amount of time may be needed from when the user speaks a speech command to when the user receives a response. Causes of this include a delay time in the communication between the terminal device and the speech recognition server, processing time in the speech recognition server etc. When there is a time lag between the user speaking and the response, the user may feel uneasy due to not knowing whether or not the speech command has been received, and may repeat the speech command, even though communication with the speech recognition server and the analysis process are being carried out normally. Because of this, there is concern that the user will feel that usability is poor.

In the technology described in JP-A-2012-256001, no notification is made to the user unless the wait time elapses (time out) or it is determined that the communication status is not good, and until then, it is unknown to the user whether the speech command has been received.

SUMMARY

In view of the foregoing, it is an object of the present disclosure to provide a technology that allows a user to interactively understand that his or her spoken speech command has been received by a speech recognition system.

According to a first example of the present disclosure, a speech recognition terminal device is capable of communicating with a predetermined speech recognition device that carries out speech recognition. The speech recognition terminal device comprises a speech acquisition device, a request device, a determination device, a filler speaking device and a response device.

The speech acquisition device acquires a speech command spoken by a user. The request device requests the speech recognition device to carry out the speech recognition of the speech command acquired by the speech acquisition device. The determination device determines a content of a filler word that fills a waiting time until a result of the speech recognition of the speech command requested from the request device is obtained from the speech recognition device. The filler speaking device outputs the content of the filler word determined by the determination device as speech information during the waiting time. When the result of the speech recognition is acquired from the speech recognition device, the response device executes a process of responding to the user based on the acquired result of the speech recognition.

According to the above configuration, the speech recognition terminal device can output a filler word for filling a waiting time during the waiting time, which is from the user speaking a speech command until a speech recognition result is obtained from a remote server etc. carrying out a speech command recognition process. By so doing, the user can recognize that the speech command he or she has spoken has been received by the system. Because of this, even when there is something of a delay until obtaining the result of speech recognition for the speech command, the user's uneasiness due to not knowing whether or not the speech command has been received can be prevented, and the user's needlessly repeating the speech command can be prevented.

According to a second example of the present disclosure, a speech recognition system comprises the above-described speech recognition termination device and a server apparatus that is provided remotely from the speech recognition termination device. The request device in the speech recognition termination device requests the server apparatus to carry out speech recognition of the speech command acquired by the acquisition device of the speech recognition termination device. When the result of the speech recognition is acquired from the server apparatus, the response device in the speech recognition termination device executes the process of responding to the user based on the acquired result of the speech recognition. The server apparatus includes a recognition process and a notification device. The recognition process device receives a request to carry out the speech recognition of the speech command from the speech recognition termination device and carry out the requested speech recognition of the speech command. The notification device notifies the speech recognition termination device, which is a sender of the request, of the result of the speech recognition carried out by the recognition process device.

According to the above speech recognition system, the waiting time from the user speaking a speech command until a speech recognition result is obtained from the remote server apparatus, a filler word for filling the waiting time can be outputted as speech to the user. By so doing, the user can recognize that the speech command he or she has spoken has been received by the system. Thus, the user's uneasiness due to not knowing whether or not the speech command has been received can be prevented, and the user's needlessly repeating the speech command can be prevented.

According to a third example of the present disclosure, a speech recognition method for a computer system to carry out speech recognition comprises: performing a speech acquisition process including acquiring a speech command spoken by a user; performing a request process including requesting a predetermined speech recognition device to carry out the speech recognition of the speech command acquired in the speech acquisition process; performing a determination process including determining a content of filler word that compensates for a waiting time until a result of the requested speech recognition of the speech command is obtained from the speech recognition device; performing a filler speaking process including outputting the determined content of the filler word as speech information during the waiting time; and when the result of the speech recognition is acquired from the speech recognition device, performing a response process of responding to the user based on the acquired result of the speech recognition.

According to this speech recognition method, the same advantages as those described in connection with the above speech recognition terminal device are obtained.

DETAILED DESCRIPTION

Embodiments of the present disclosure will be described based on the drawings. Embodiments are not limited to the following embodiments and can be implemented in various forms.

(Speech Recognition System Configuration)

Figure 1:
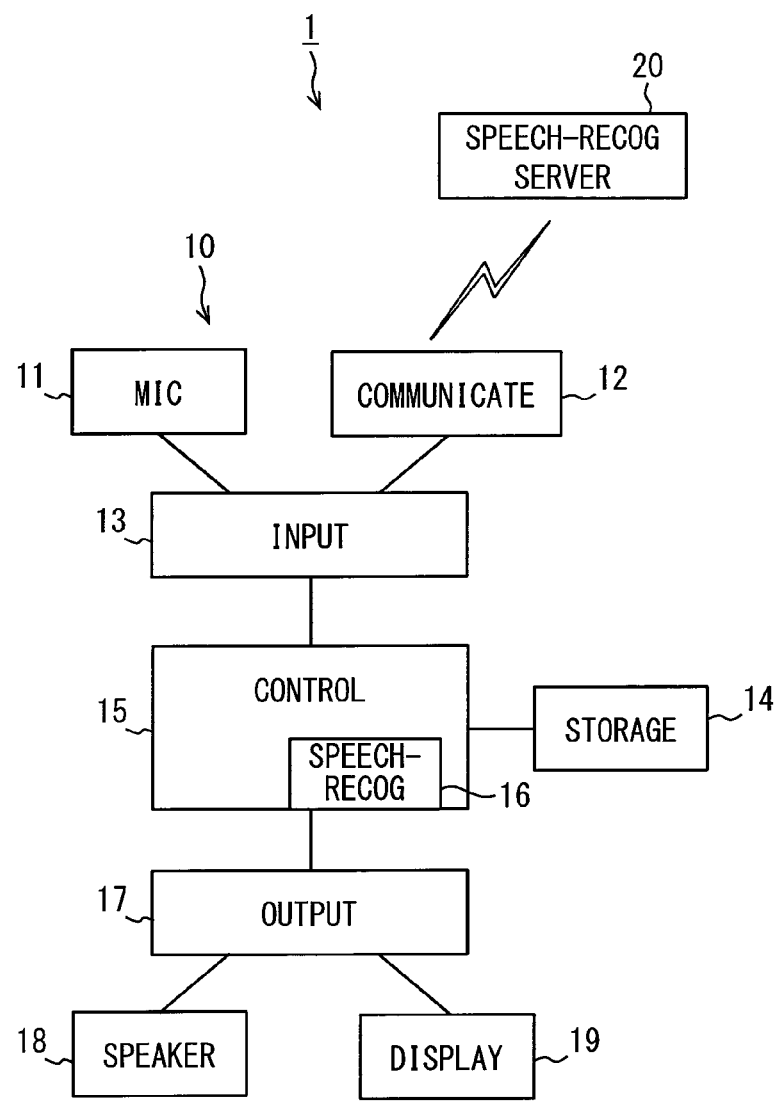
FIG. 1 is a block diagram illustrating a configuration of a speech recognition system.

As shown in FIG. 1, a speech recognition system 1 includes a speech recognition terminal device 10, and a remote speech recognition server 20. The remote speech recognition server 20 and the response delay time server 30 can communicate with the speech recognition terminal device 10. The speech recognition terminal device 10 is realized as, for example, a vehicle mounted system such as a vehicle mounted navigation device including a speech recognition function. Alternatively, not being limited to a vehicle mounted system, the speech recognition terminal device 10 may be mounted in a portable terminal device such as a so-called smartphone.

The speech recognition terminal device 10 includes a microphone 11, a communication device 12, an input device 13, a storage device 14, a control device 15, an output device 17, a speaker 18, and a display 19. The microphone 11 is an input device for inputting a speech command spoken by a user. The communication device 12 is a communication device that carries out an exchange of data with the remote speech recognition server 20 via a predetermined communication path. The input device 13 is an input interface for inputting data into the control device 15. The input device 13 inputs a speech command input via the microphone 11 into the control device 15, and transmits the speech command to the speech recognition server 20 via the communication device 12. The input device 13 converts an input speech command into, for example, compressed speech data of a predetermined file format, and transmits the compressed speech data to the speech recognition server 20. The input device 13 receives a response message expressing the result of information processing, which is carried out in the speech recognition server 20 based on the transmitted speech command. The input device 13 inputs the received response message into the control device 15.

The storage device 14 is a storage device that stores various kinds of information. For example, the storage device 14 stores a program executed by the control device 15, and data used when the program is executed. Further, the storage device 14 stores data of recognition dictionary for recognition of speech commands. The storage device 14 stores a dictionary, which pre-stores data expressing filler words, which may be spoken during the waiting time until a response message is received from the speech recognition server 20 device. Further, the storage device 14 stores a dictionary of templates, which include patterns for creating a filler word using a keyword extracted from a speech command.

The control device 15 is an information processing device (for example, a microcomputer) including a CPU, ROM, RAM, and the like. The control device 15 controls an operation of the speech recognition terminal device 10 by executing a program. A speech recognition device 16 may be a functional configuration that performs speech recognition of a user's speech command inputted via the input device 13 and extracts a keyword contained in the speech command. A result of the speech recognition by the speech recognition device 16 is used to create a filler word. The output device 17 is an output interface that outputs a speech from the speaker 18, and causes an image to be displayed on the display 19, in accordance with a control by the control device 15.

The speech recognition server 20 is a server that provides a speech recognition service, and may be realized by, for example, a server device constructed on a computer network such as the Internet. The speech recognition server 20 receives speech command data from the speech recognition terminal device 10, and analyzes the contents of the speech command using speech recognition. Then, the speech recognition server 20 generates a response message expressing the result of information processing based on the analyzed speech command contents, and transmits the response message to the speech recognition terminal device 10, which is the source (sender) of the speech command. Service may include the followings, for example. The speech recognition server 20 sends a response message expressing a reply to a question from the user The speech recognition server 20 searches for useful information by using a Web service, or the like based on a key word included in the speech command and sends a response message expressing the search result. Alternatively, the speech recognition server 20 may send a text message expressing the contents of the analyzed speech command, or a control command that can be executed by the speech recognition terminal device 10.

The control device 15 of the speech recognition terminal device 10 executes an output process based on the response message received from the speech recognition server 20. For example, the control device 15 reads aloud the information contained in the response message received, or displays the information as an image. Alternatively, the control device 15 may operate an instrument such as vehicle mounted equipment in accordance with the contents of the response message.

(Speech Command Process in Speech Recognition System)

Figure 2:
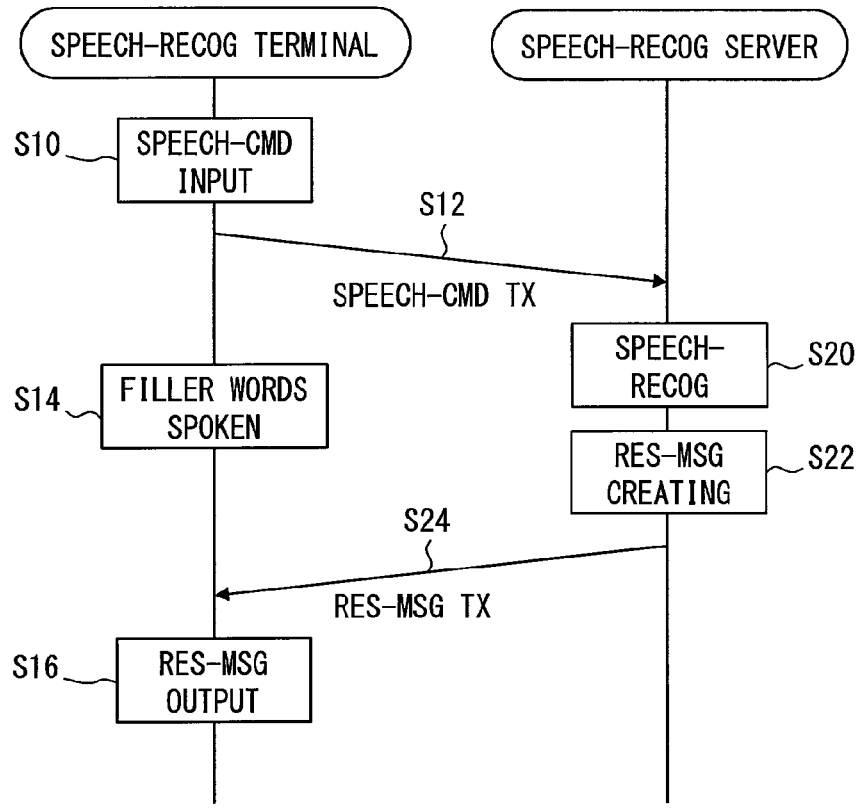
FIG. 2 is a sequence diagram illustrating a process procedure in the speech recognition system.

A procedure of a speech command process executed in the speech recognition system 1 will be described based on the sequence diagram of FIG. 2.

First, the speech recognition terminal device 10 receives an input of a speech command from a user (S10), and transmits data on the input speech command to the speech recognition server 20 (S12). The speech recognition server 20 carries out a speech recognition process in response to receipt of the speech command data from the speech recognition terminal device 10, and analyzes the contents of the speech command (S20). Then, the speech recognition server 20 generates a response message in accordance with the analyzed speech command contents (S22). The speech recognition server 20 transmits the generated response message to the speech recognition terminal device 10 (S24).

A certain response delay time occurs between when the user inputs the speech command and when the user obtains the response message from the speech recognition server 20. In the embodiments, this waiting time is called a response delay time. The response delay time is caused by the time of a delay in communication between the speech recognition terminal device 10 and the speech recognition server 20, time needed for processing in the speech recognition server 20, and the like. Therefore, the speech recognition terminal device 10 says a filler word to fill the response delay time (S14). Then, upon receipt of the response message from the speech recognition server 20, the speech recognition terminal device 10 executes an output process, such as a speech output or display output, based on the received response message (S16).

Figure 3:
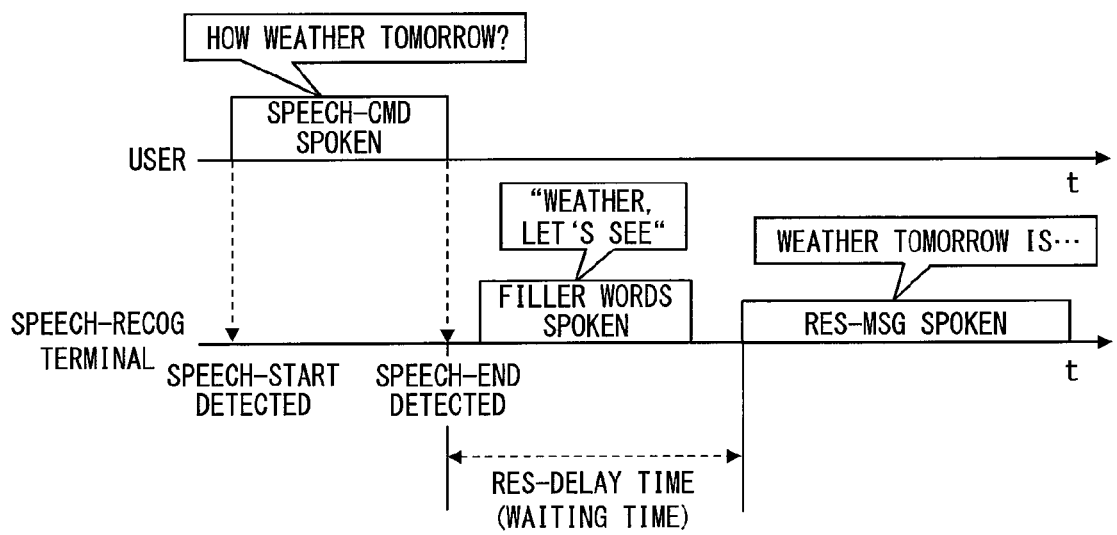
FIG. 3 is a timing chart illustrating timings of speaking filler words.

Based on the timing chart of FIG. 3, explanation will be given on the timing at which the speech recognition terminal device 10 says a filler word during the later-described speech command process. Now, suppose that the user speaks a speech command with the contents "How's the weather tomorrow?" The speech recognition terminal device 10, on detecting the end of the speech command, determines the contents of filler word of a temporal length, and says the filler word with the determined contents during the response delay time. In the example of FIG. 3, the keyword "weather" contained in the inputted speech command is used and the filler words with the content "weather, let's see" are vocally output from the speaker 18.

Subsequently, when the response message to the user's speech command is obtained from the speech recognition server 20, the contents of the response message are vocally output from the speaker 18. In the example in FIG. 3, a response message with the contents "The weather tomorrow is xxxx" is output as a reply to the speech command that asked about the next day's weather.

When a response message is received from the speech recognition server 20 while the filler words are being spoken, the response message may be output after waiting to complete the speaking of the filler words, or the speaking of the filler word may be interrupted at that point, and the response message output immediately.

(Filler Speaking Process)

Figure 4:
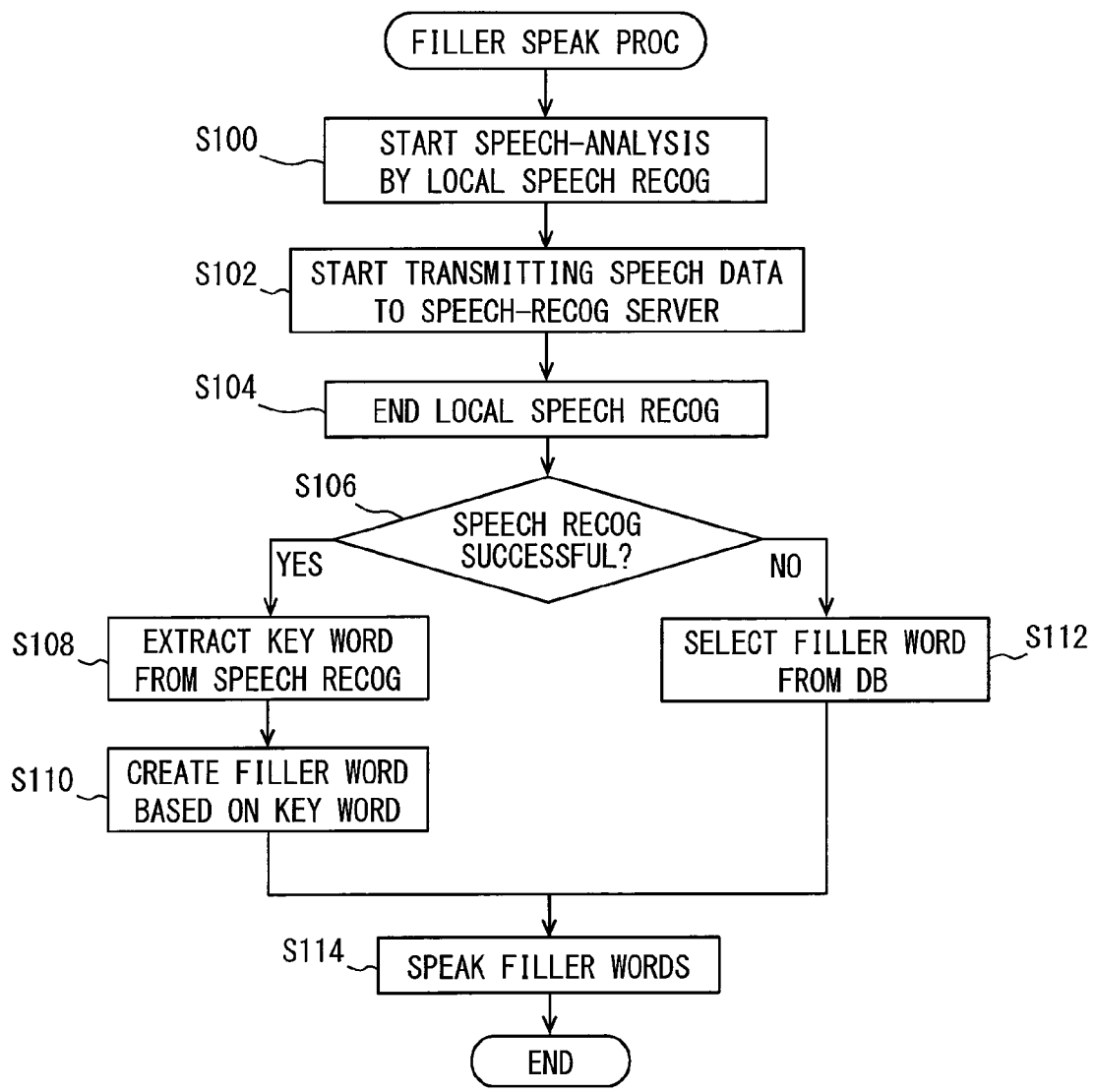
FIG. 4 is a flowchart illustrating a filler speaking process.

With reference to the flowchart of FIG. 4, explanation will be given on a procedure of a "Filler Speaking Process" executed by the control device 15 of the speech recognition terminal device 10. This process is executed when the start of a speech command from a user is detected.

In S100, the control device 15 starts a local speech recognition process with the speech recognition device 16 in parallel (conjunction) to the input of a speech command via the microphone 11. In S102, the control device 15 starts the transmission of the speech command to the speech recognition server 20 in conjunction with the input of the speech command via the microphone 11. In the above, the input speech command is converted into compressed speech data of a predetermined file format, and transmitted to the speech recognition server 20. In the S104, the control device 15 detects the end of the input of the speech command and ends the local speech recognition process.

In S106, the control device 15 determines whether or not the speech recognition of the speech command by the speech recognition device 16 is successful. When the speech recognition is successful (S106: YES), the control device 15 proceeds to S108. When the speech recognition is unsuccessful (S106: NO), the control device 15 proceeds to S112.

In S108, the control device 15 extracts a keyword from the content of the recognized speech command. Specifically, from among multiple words contained in the speech command, a word corresponding to a specific lexical category such as general noun, proper noun, verb or the like may be preferentially extracted. For example, when the speech command is "How is the weather in New York", "New York" or "weather" may be extracted as the keyword. The total number of extracted keyword may be one or more. When a single keyword is extracted, one word corresponding to a preset attribute may be preferentially extracted from among multiple keyword candidates.

In S110, the control device 15 creates a filler word by applying the keyword extracted in S108 to the templates of filler word acquired from the template dictionary stored in the storage device 14. For example, the keyword "weather" may be applied to a black portion of the template "○ ○ (blank), let's see", so that the filler words "weather, let's see" are created. Multiple templates may be prepared on an attribute-by-attribute basis, and an optimum template may be selected according to the attribute of the extracted keyword.

As an example, the configuration may be such that the control device 15 randomly selects a filler word from among a plurality of kinds of filler word recorded in advance in the dictionary, those being "Let's see", "Just a moment", and the like. At this time, the configuration may be such that a filler word differing from the filler words used on the previous occasion is selected, so that the filler words the same as the filler words used on the previous occasion are not used on consecutive occasions.

In S114, the control device 15 causes the speaker 18 to output the filler word created in S110 or the filler word selected in S112. After S114, the control device 15 ends the filler speaking process.

(Response Output Process)

Figure 5:
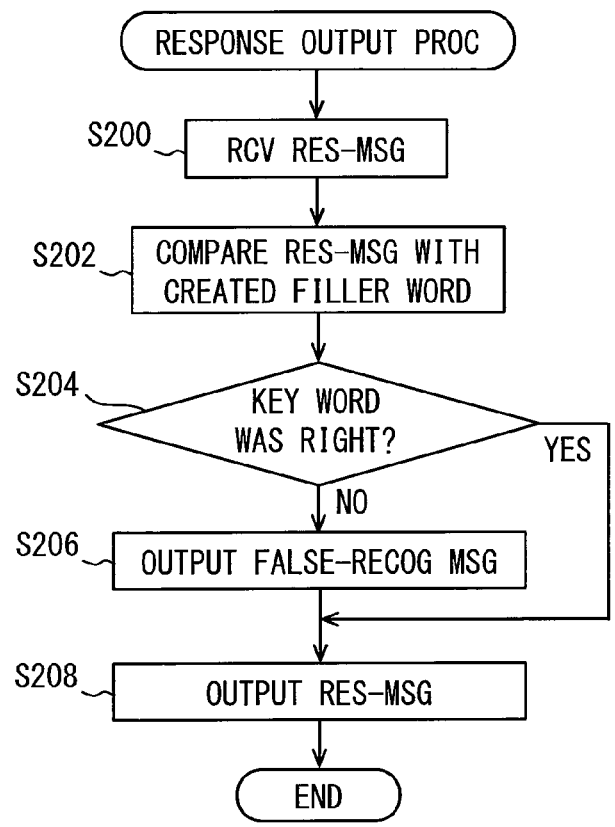
FIG. 5 is a flowchart illustrating a response output process.

With reference to the flowchart of FIG. 5, explanation will be given on a procedure of a "Response Output Process" executed by the control device 15 of the speech recognition terminal device 10. This process is executed when a speech command is transmitted to the speech recognition server 20. This process may be executed by a CPU of the control device 15 in accordance with a program stored in a storage device.

In S200, the control device 15 receives the response message from the speech recognition server 20. In S202, the control device 15 compares the content of the received response message with the keyword used in creating the filler word in S110, and determines whether or not the content of the received response message matches the keyword.

In S204, the control device 15 proceeds to different processes, depending on a result of the comparison in S200 indicating whether or not the content of the response message matches the keyword used in creating the filler words. When the content of the response message does not match the keyword used in creating the filler words (S204: NO), the controller 15 proceeds to S206. When the content of the response message matches the keyword used in creating the filler words (S204: YES), the controller 15 proceeds to S208. Additionally, in S204, the control device 15 proceeds to S208 when the ready-made filler words stored in the storage device 14 are outputted in the above-described filler speaking process (see FIG. 4).

In S206, the control device 15 causes the speaker 18 to audibly output an error-recognition notification message notifying that the spoken content of the filler words is error. Specifically, when the keyword used in creating the filler words is different from the content of speech command recognized in the response message, a message including contents for correcting this may be outputted. For example, suppose a situation where a conjunction including a certain keyword "XXX" is uttered but the content of the response message relates to a different word "YYY" that is similar in pronunciation to "XXX". In such a case, an error-recognition notification message for correcting this is outputted such as a massage indicating that "I made a mistake and I should have spoken it as "YYY".

In S208, the control device 15 executes a responding process based on the response message received from the speech recognition server 20. In the above, the control device 15 reads aloud the content of the response message received, displays the content as an image, or operates an instrument such as vehicle mounted equipment in accordance with the content of the response message. After S208, the control device 15 ends the processing.

Modifications

In the above filler speaking process (see FIG. 4), a filler word(s) with a time length matching a response delay time that is predicted when the speech command is transmitted to the speech recognition server 20 may be selected. Specifically, multiple kinds of ready-made filler words with time lengths taken for speech may be pre-defined in a dictionary stored in, for example, a storage device 14. In accordance with the predicted response delay time, filler words with an appropriate time length may be selected. When filler words are created using the keyword acquired in the local speech recognition, a time length of filler words may be adjusted by connecting some of the templates. It is noted that the response delay time may be predicted based on, for example, a communication condition with the speech recognition server 20, a past communication history or the like.

In the above embodiment, the speech recognition server 20 is provided by a remote server or the like on the Internet. Alternatively, the speech recognition terminal device 10 and the speech recognition server 20 may be connected to a local area network (LAN). Alternatively, a function of the speech recognition terminal device 10 and a function of the speech recognition server 20 may be provided by a single computer system.

Advantages

The speech recognition system 1 of the above embodiments can provide, for example, the following advantages. During the waiting time from when the speech command is uttered by the user to when the response message is received from the speech recognition server 20, the speech recognition terminal device 10 can output speech of the filler word to fill the waiting time. Accordingly, the user can recognize that his or her spoken speech command has been received by the system. Thus, even when there is something of a delay until obtaining a response message responsive to the speech command, the user's uneasiness due to not knowing whether or not the speech command has been received can be minimized.

Additionally, the speech recognition terminal device 10 can create the filler word by applying the keyword, which is extracted from the user's speech command, to the template. This enriches a variation of filler words. Additionally, even when the keyword cannot be extracted from the speech command, the filler word can be selected from among the ready-made filler words prepared in advance and the selected filler words can be outputted. Therefore, a wide variety of filler words can be outputted.

Although embodiments and configurations of the present disclosure have been illustrated in the above, however, the embodiments and the configurations of the present disclosure are not limited to each of the embodiments and each of the configurations illustrated above. For example, embodiments and configurations which are obtained by combining suitably the technical parts respectively disclosed in the different embodiments and configurations are also included in the embodiment and the configuration of the present disclosure.

What is claimed is:

1. A speech recognition terminal device capable of communicating with a predetermined speech recognition device that carries out speech recognition, the speech recognition terminal device comprising:
   a speech acquisition device that acquires a speech command spoken by a user;
   a request device that requests the speech recognition device to carry out the speech recognition of the speech command acquired by the speech acquisition device;
   a determination device that determines a content of a filler word for filling a waiting time until a result of the speech recognition of the speech command requested from the request device is obtained from the speech recognition device,
   a filler speaking device that outputs the content of the filler word, which is determined by the determination device, as speech information during the waiting time;
   a response device that, when the result of the speech recognition is acquired from the speech recognition device, executes a process of responding to the user based on the acquired result of the speech recognition, and
   a sub-recognition device that recognizes a spoken content of the speech command acquired by the speech acquisition device, wherein
   the determination device creates the content of the filler word containing at least part of the spoken content of the speech command acquired by the speech acquisition device, and
   the determination device creates the filler word by applying at least part of the spoken content of the speech command recognized by the sub-recognition device to a template of preset filler word.

2. The speech recognition terminal device according to claim 1, wherein:
   a plurality of the templates are set on an attribute-by-attribute basis; and
   the determination device creates the filler word using, out of the plurality of templates, a template that matches the attribute of the spoken content of the speech command recognized by the sub-recognition device.

3. The speech recognition terminal device according to claim 1, wherein:
   a ready-made filler word with a completed contents is preset;
   the template of the filler word is preset;
   when the sub-recognition device successfully recognizes the spoken content of the speech command, the determination device creates the content of the filler word containing at least part of the recognized spoken content of the speech command; and when the sub-recognition device unsuccessfully recognizes the spoken content of the speech command, the determination device determines the ready-made filler word as an output subject.

4. A speech recognition terminal device capable of communicating with a predetermined speech recognition device that carries out speech recognition, the speech recognition terminal device comprising:
- a speech acquisition device that acquires a speech command spoken by a user;
- a request device that requests the speech recognition device to carry out the speech recognition of the speech command acquired by the speech acquisition device;
- a determination device that determines a content of a filler word for filling a waiting time until a result of the speech recognition of the speech command requested from the request device is obtained from the speech recognition device;
- a filler speaking device that outputs the content of the filler word, which is determined by the determination device, as speech information during the waiting time;
- a response device that, when the result of the speech recognition is acquired from the speech recognition device, executes a process of responding to the user based on the acquired result of the speech recognition;
- a sub-recognition device that recognizes a spoken content of the speech command acquired by the speech acquisition device;
- a determining device that determines whether or not the content of the filler word created using the spoken content of the speech command recognized by the sub-recognition device matches the result of the speech recognition acquired from the speech recognition device; and
- a notification device that notifies the user that the filler word is error when the determining device determines that the content of the filler word does not match the result of the speech recognition acquired from the speech recognition device, wherein
the determination device creates the content of the filler word containing at least part of the spoken content of the speech command acquired by the speech acquisition device.

5. A speech recognition terminal device capable of communicating with a predetermined speech recognition device that carries out speech recognition, the speech recognition terminal device comprising:
- a speech acquisition device that acquires a speech command spoken by a user;
- a request device that requests the speech recognition device to carry out the speech recognition of the speech command acquired by the speech acquisition device;
- a determination device that determines a content of a filler word for filling a waiting time until a result of the speech recognition of the speech command requested from the request device is obtained from the speech recognition device;
- a filler speaking device that outputs the content of the filler word, which is determined by the determination device, as speech information during the waiting time; and
- a response device that, when the result of the speech recognition is acquired from the speech recognition device, executes a process of responding to the user based on the acquired result of the speech recognition, wherein:
from among a plurality of preset ready-made filler words, the determination device selects a specific ready-made filler word as an output subject, and
based on a history of usage of the plurality of ready-made filler words, the determination device selects the specific ready-made filler word as the output subject.

6. A speech recognition method for a computer system to carry out speech recognition, comprising:
- performing a speech acquisition process including acquiring a speech command spoken by a user;
- performing a request process including requesting a predetermined speech recognition device to carry out the speech recognition of the speech command acquired in the speech acquisition process;
- performing a determination process including determining a content of a filler word for filling a waiting time until a result of the requested speech recognition of the speech command is obtained from the speech recognition device;
- performing a filler speaking process including outputting the determined content of the filler word as speech information during the waiting time;
- when the result of the speech recognition is acquired from the speech recognition device, performing a response process including responding to the user based on the acquired result of the speech recognition; and
- performing a sub-recognition process including recognizing a spoken content of the speech command acquired in the speech acquisition process, wherein:
the determination process includes creating the content of the filler word containing at least part of the spoken content of the speech command recognized in the sub-recognition process;
the filler speaking process includes outputting the filler word determined in the determination process; and
the determination process includes creating the filler word by applying at least part of the spoken content of the speech command recognized in the sub-recognition process to a template of preset filler word.

7. The speech recognition method according to claim 6, wherein:
a plurality of the templates are set on an attribute-by-attribute basis; and
the determination process includes creating the filler word using, out of the plurality of the templates, a template that matches the attribute of the spoken content of the speech command recognized in the sub-recognition process.

8. The speech recognition method according to claim 6, wherein:
a ready-made filler word with a completed content is preset;
the template of filler word is preset; and
the determination process includes:
when the sub-recognition process successfully recognizes the spoken content, creating the content of the filler word containing at least part of the spoken content of the speech command acquired by the speech acquisition device; and
when the sub-recognition process unsuccessfully recognizes the spoken content, determining the ready-made filler word as an output subject.

9. A speech recognition method for a computer system to carry out speech recognition, comprising:
performing a speech acquisition process including acquiring a speech command spoken by a user;

performing a request process including requesting a predetermined speech recognition device to carry out the speech recognition of the speech command acquired in the speech acquisition process;

performing a determination process including determining a content of a filler word for filling a waiting time until a result of the requested speech recognition of the speech command is obtained from the speech recognition device;

performing a filler speaking process including outputting the determined content of the filler word as speech information during the waiting time;

when the result of the speech recognition is acquired from the speech recognition device, performing a response process including responding to the user based on the acquired result of the speech recognition;

performing a sub-recognition process including recognizing a spoken content of the speech command acquired in the speech acquisition process, wherein:

the determination process includes creating the content of the filler word containing at least part of the spoken content of the speech command recognized in the sub-recognition process;

the filler speaking process includes outputting the filler word determined in the determination process;

performing a determining process including determining whether or not the content of the filler word created using the spoken content of the speech command recognized in the sub-recognition process matches the result of the speech recognition acquired from the speech recognition device; and performing a notification process including notifying the user that the filler word is error when the determining device determines that the content of the filler word does not match the result of the speech recognition acquired from the speech recognition process.

10. A speech recognition method for a computer system to carry out speech recognition, comprising:

performing a speech acquisition process including acquiring a speech command spoken by a user;

performing a request process including requesting a predetermined speech recognition device to carry out the speech recognition of the speech command acquired in the speech acquisition process;

performing a determination process including determining a content of a filler word for filling a waiting time until a result of the requested speech recognition of the speech command is obtained from the speech recognition device;

performing a filler speaking process including outputting the determined content of the filler word as speech information during the waiting time; and when the result of the speech recognition is acquired from the speech recognition device, performing a response process including responding to the user based on the acquired result of the speech recognition;

wherein:

the determination process includes from among a plurality of preset ready-made filler words, selecting a specific ready-made filler word as an output subject; and selecting the specific ready-made filler word as the output subject based on a history of usage of the plurality of ready-made filler words.

\* \* \* \* \*